Patented Nov. 21, 1950

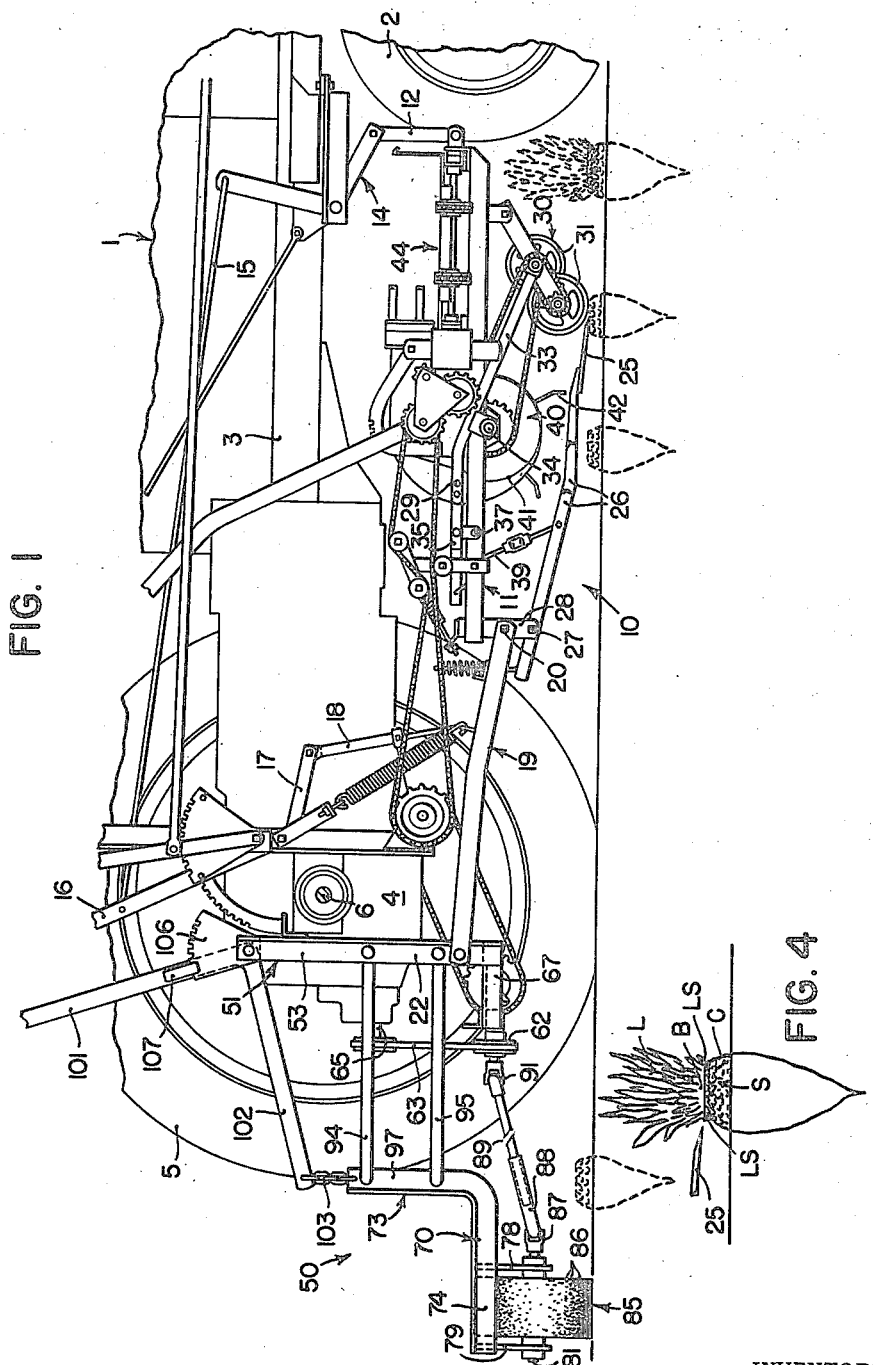

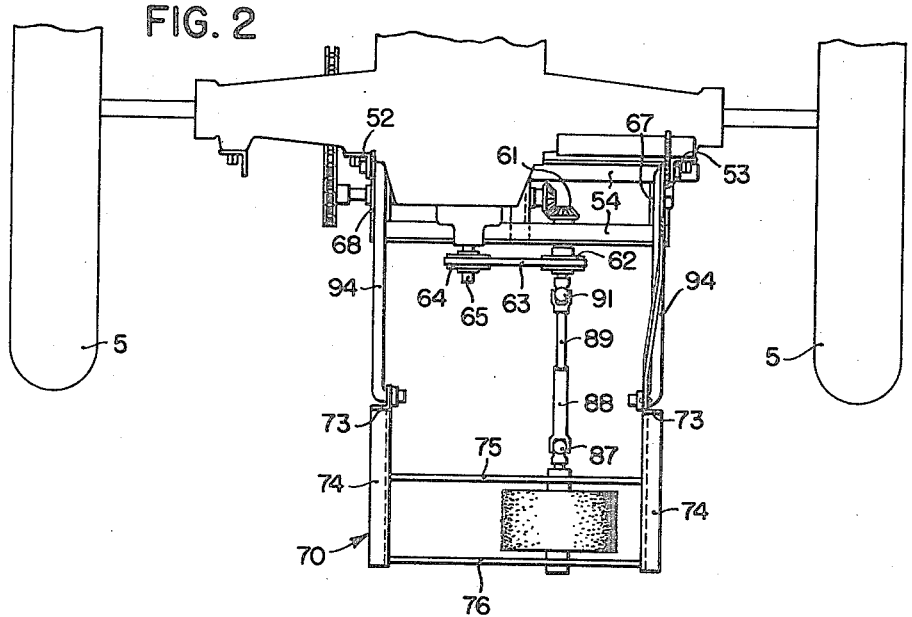
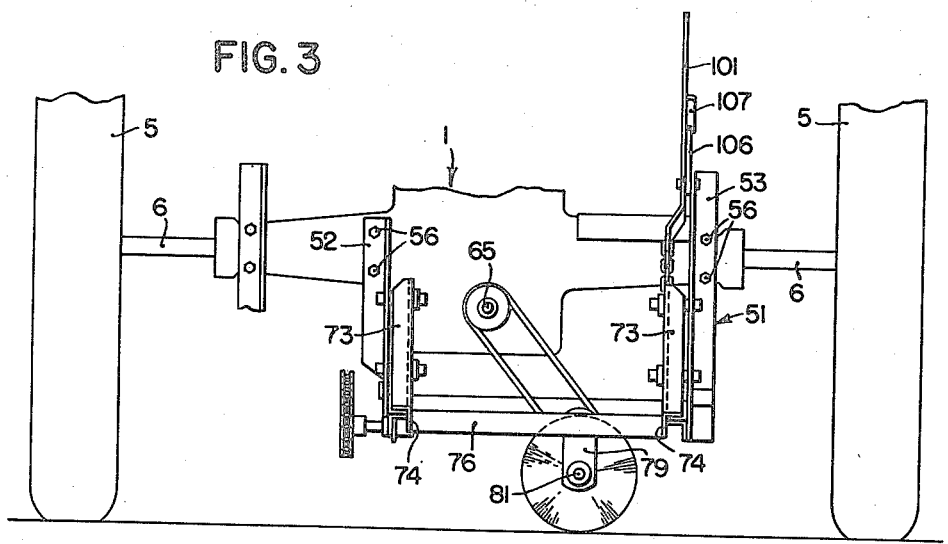

2,531,193

UNITED STATES PATENT OFFICE 2,531,193

BEET HARVESTER

Thomas W. Bohmker, Geneseo, Claude W. Walz, Rock Island, and James H. Clark, Moline, Ill., assignors to Deere & Company, Moline, Ill., a corporation of Illinois Application April 10, 1947, Serial No. 740,510

5 Claims. (Cl. 56—121.43)

1

The present invention relates generally to agricultural implements and more particularly to machines for harvesting sugar beets and the like.

The object and general nature of the present invention is the provision of a new and improved sugar beet harvester which includes two cooperating units arranged in generally tandem relation, both adapted to be mounted on a tractor. The first unit includes cutting means so constructed and arranged as to sever only the upper portions of the beet crowns, generally referred to as the bud, from which at least the major portions of the standing leaves extend, leaving the major portion of the crown of the beet, together with any leaf scar, leaf stubs and the like intact with the beet. The second unit includes an abrading tool operative when driven to abrade or scour the crown of the beet so as to remove the leaf scar, leaf stubs and any remaining leaves from the beet crowns but without cutting away any appreciable quantity of the sugar bearing portions of the crown of the beet. The beets subsequently are lifted from the ground by a separate machine.

More specifically, it is an object of this invention to provide a cutting knife and means for controlling the latter so that in operation the knife passes through only the upper portion of the crown and severs from the crown substantially only the bud thereof, together with any standing leaves or other portions adhering to the bud, in combination with a rotary tool in the nature of a rotary wire brush or the like operative in a vertical transverse plane and rotatable generally about a longitudinal axis and raised and lowered so as to rub or abrade the superficial portions of the beet crowns, thus eliminating any remaining leaf stubs, the leaf scar and other non-sugar-containing portions of the beet crown, leaving the major part of the beet crown intact with the main sugar-containing body of the sugar beet.

These and other objects and advantages of the present invention will be apparent to those skilled in the art after a consideration of the following detailed description, taken in conjunction with the accompanying drawings, in which:

Figure 1 is a side view of a beet harvester incorporated in the principles of the present invention.

Figures 2 and 3 are top and rear views of the beet abrading unit carried on the rear of the tractor and operated in conjunction with the topping unit which removes the buds from the upper portions of the beet crowns.

Figure 4 is an enlarged fragmentary view showing the action of the topping knife in cutting off only the bud or upper portion of each beet crown.

Referring now to the drawings, particularly Figures 1 and 2, the beet harvester of the present invention is shown as mounted on a tractor 1 of more or less conventional construction, embodying front wheels 2, a narrow elongated supporting frame 3 and a rear axle structure 4 which includes rear wheels 5 mounted on axle shafts 6 journaled for rotation in lateral extensions that form a part of the rear axle structure 4. The forward unit, which removes the buds and at least the major portions of the standing leaves from the crowns of the beets, is indicated in its entirety by the reference numeral 10 and comprises, in general, a frame 11 mounted for generally vertical movement relative to the tractor 1 and preferably suspended therefrom by suitable vertically adjustable link means 12 pivotally connected at their lower ends to the frame 11 and at their upper ends to a bell crank 14 mounted for rocking movement on the tractor and controlled by one or more links 15 extending rearwardly from the bell crank 14 to a raising and lowering lever 16. The latter includes an extension 17 that is connected by an adjustable link 18 with a rear portion of the frame 11 through a push frame 19 that is pivotally connected at its front end with the frame 11, as shown at 20, and at its rear end with the lower portion 22 of a suitable support 51 (referred to in detail below) bolted or otherwise connected to the rear axle of the tractor. The unit 10 also includes a transverse cutting knife 25 that is fixed to a pair of arms 26 which are pivoted, as at 27, to a bracket 28 that forms a part of the frame 11. The transverse knife 25 may be raised and lowered by means of a finder unit 30 which includes beet-contacting wheels 31 mounted on a support 32 that is connected to raise and lower the knife through a pair of arms 33 which are pivotally connected, as at 34, to the frame 11 and which have their rear ends pivoted, as at 29, to a second pair of levers 35 swingably and pivotally mounted, as at 37, on the frame 11. The rear ends of the levers 35 are connected to the knife arms 26 through downwardly extending adjustable links 39. The cut tops are removed from the knife 25 and knife arms 26 by pickup mechanism 40 which includes a rotatable drum 41 having top engaging fingers 42 which engage the tops, sweep them rearwardly and upwardly, and then forwardly, alternately depositing them onto a top conveyor 44.

The linkage mechanism connecting the transverse knife with finder means 30 is arranged so that in operation the transverse knife passes through the upper portions of the crown of each beet, cutting from these crowns only the bud B, (Figure 4) together with any standing leaves or tops extending therefrom, leaving the major portion of the crown C of each beet intact. The bud of the crown C contains practically no sugar content, and the same is true of course of the leaves L. However, the crowns generally bear a superficial layer of leaf scar, indicated at S, and possibly also leaf stubs, indicated by the reference character LS. The unit 10, however, removes the major portions of the tops and disposes of them by means of the top conveyor 44 as described above, thus making it possible for the farmer to save the tops for feeding or other purposes.

The major portion of the crown C of each beet contains an appreciable quantity of sugar, which was lost in topping the beets by prior machines wherein the topping knife severs the major portion of the crown from the beet so as to eliminate leaf scar from the harvested product. It would not be economical to market sugar beets with only the buds and standing leaves removed because the presence of the leaf scar and other superficial non-sugar-containing portions would materially increase the tare and substantially reduce the market value of the product. Accordingly, according to the present invention, we provide means for removing the leaf scar, remaining leaves and leaf stubs and the like, from the crowns of the beets, after the buds and standing leaves have been removed, but without appreciably cutting away any portions of the crowns that contain sugar.

In order to remove leaf scar and other superficial portions from the beet crowns without taking away any of the sugar bearing portions thereof, we provide a rear beet crown abrading or scouring unit indicated in its entirety by the reference numeral 50. The unit 50 includes a U-shaped support 51, preferably in the form of a vertically arranged frame structure having side sections 52 and 53 and a central or connecting section 54, the side sections being apertured to receive studs 56 by which the frame 51 may be rigidly secured to the rear axle 4 of the tractor. Preferably, the frame or support 51 is mounted laterally offset, and carried on the central section 54 of the frame or support 51 is a longitudinally extending shaft 61 on which the belt pulley 62 is mounted, and trained over the pulley or sheave 62 is a belt 63 which at its upper end passes over a pulley or sheave 64 mounted on the power takeoff shaft 65 of the tractor. It will be noted particularly from Figures 2 and 3 that the shaft 61 is disposed to the right of the center line on the tractor. The center section 54 of the frame or support 51 is carried on the side sections 52 and 53 by means of rearward extensions 67 and 68 of the latter.

An auxiliary frame 70 supports the beet crown abrading tool and comprises two L-shaped angle bars 73 the rearwardly extending horizontal sections 74 of which are connected by a pair of fore and aft spaced transverse bars 75 and 76. These bars carry bearing brackets 78 and 79 in which a shaft 81 is a rotary or abrading scouring tool, generally in the form of a wire brush 85 having relatively stiff bristles 86 and mounted to rotate in a vertical transverse plane about the generally longitudinal axis defined by the shaft 81. The latter member is connected by a universal joint 87 to one section 88 of a pair of telescopically associated shafts, the other section of which is indicated by the reference numeral 89 and the forward end of which is connected by a universal joint 91 to the rear portion of the shaft 61.

The auxiliary frame 70 is connected for vertical movement relative to the support 51 by means of pairs of generally parallel links 94 and 95. The forward ends of the links 94 and 95 are pivotally connected with the side sections 52 and 53 of the support 51, and the rear ends of the links 94 and 95 are pivotally connected with the vertically extending portions 97 of the auxiliary frame members 73. The rotary brush 85 is driven whenever the power takeoff shaft 65 of the tractor is engaged with the transmission or other portion of the tractor.

The auxiliary frame 70, together with the tool 85, is raised and lowered by means of a hand lever 101 pivotally mounted on the upper end of the right hand support section 53 and carrying a rearwardly extending arm 102 that is connected by a chain 103 with the upper end of the right hand auxiliary frame member 73. A sector 106 is fixed to the support 51 and cooperates with detent mechanism 107 carried by the hand lever 101 for releasably holding the latter in different positions of adjustment.

In operation, the tractor is driven along a row of beets to be harvested and the position of the unit 10 adjusted so that the transverse knife 25 cuts through the upper portions of the beet crowns just underneath the bud B of each beet, the knife being adjusted vertically by the finder unit 30. Rearwardly of the transverse knife 25, the rotary abrading tool 85 is adjusted vertically so that the relatively stiff bristles 86 rub or abrade the beet crowns with sufficient force to remove the superficial layers of leaf scar, together with any remaining leaf stubs or flattened leaves or remnants thereof. Generally, the weight of the unit 50 is sufficient to cause the abrading tool 85 to bear on the beet crowns with sufficient force to remove all unwanted portions of the beet crowns, the brush rotating in such direction as to sweep the fragments, thus removed from the beet crowns, and scatter the same in or away from the beet row. The abrading unit 85 need not be rotated at excessively high speed or be forced downwardly against the beet crowns by excessive pressure since the unit 85 is called upon to remove only the superficial layers of the beet crowns, the major portions of the beet tops, together with the buds of the crown, being removed by the transverse cutting knife 25 of the unit 10.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. For use in a beet harvester adapted to be mounted on a tractor having a rear axle and a power take-off shaft, and which includes a topping unit mounted on the tractor, and a push frame connected between the rear axle of the tractor and said unit, the latter including means for removing the bud, standing leaves and the like from the upper portions of the crowns of the beets; the improvement comprising a support adapted to be fixed to said tractor rear axle on the rear side thereof in depending relation with respect thereto, shaft means mounted on the lower portion of said support, means for driving said shaft from said tractor power take-off shaft, auxiliary frame means, generally vertically swingable link means connecting said auxiliary frame means with said support generally above said shaft means, and means carried by said auxiliary frame means and driven by said shaft means for removing the leaf scar and any remaining leaves from the crowns of said beets.

2. For use with a beet harvester comprising a mobile frame, a generally transversely disposed cutting knife movably carried by said frame, beet engaging means movably carried by said frame and engageable with the beets in the beet row traversed by said harvester, and means interconnecting said beet engaging means with said knife for adjusting the position of the latter so as to cause the knife to cut off the bud and any standing leaves from the upper portions of the crown of each beet, leaving the major portion of the crown and leaf scar on the beet; the improvement comprising a support adapted to be fixed to the rear portion of said mobile frame rearwardly of said cutting knife, an auxiliary frame, generally parallel link means connected at their rear ends with said auxiliary frame and at their forward ends with said support and providing for generally vertical movement of said auxiliary frame relative to said support, a rotary abrading tool carried by said auxiliary frame and rotatable in a transverse plane about a generally longitudinally extending axis, means for driving said abrading tool, and means for raising and lowering said auxiliary frame so as to cause said tool to remove the leaf scar and any remaining leaves and the like from the crowns of the beets while leaving the major interior portion of the crown intact with the beet.

3. In a beet harvester, a device for removing leaf scar, leaf stubs and the like from topped beets by an abrading action, comprising a mobile frame, a support carried thereby, an auxiliary frame, generally parallel links connecting said auxiliary frame with said support, a rotary brush carried by said auxiliary frame and rotatable about a generally longitudinal axis, means on said support for raising and lowering said auxiliary frame, and universal joint and telescoping shaft means for driving said rotary brush, said driving means including a shaft supported in a longitudinal position on the lower portion of said support.

4. A beet harvester adapted to be mounted on a tractor having a rear axle and a generally rearwardly extending power takeoff shaft, the combination of a support comprising a generally U-shaped member having upwardly extending sections adapted to be connected to the rear axle of a tractor generally on opposite sides of the center line thereof and a lower section connecting said upwardly extending sections, an auxiliary frame, means including pairs of generally parallel links connecting said auxiliary frame with the side sections of said U-shaped support, a beet crown scouring tool carried by said auxiliary frame and including a rotary member having a plurality of beet crown engaging parts and mounted for rotation on said auxiliary frame for movement about a generally longitudinal axis disposed to one side of the center line of the tractor, shaft means carried by the lower central section of said U-shaped support, means for driving said shaft means from the power takeoff shaft of the tractor and articulated drive means extending from said shaft means to said rotary tool for driving the latter from said shaft means and the power takeoff shaft.

5. The invention set forth in claim 4, further characterized by means including a lever mounted on the upper end of one of said support side sections and connected with one side of said auxiliary frame for raising and lowering the latter relative to the tractor.

THOMAS W. BOHMKER.
CLAUDE W. WALZ.
JAMES H. CLARK.

REFERENCES CITED

The following references are of record in the file of this patent:

UNITED STATES PATENTS

| Number | Name | Date |
| --- | --- | --- |
| 1,886,843 | Sherman | Nov. 8, 1932 |
| 2,084,398 | Jongeneel | June 22, 1937 |
| 2,250,948 | Garst | July 29, 1941 |
| 2,354,112 | Garst | July 18, 1944 |
| 2,406,013 | Grew | Aug. 20, 1946 |
| 2,433,799 | Walz | Dec. 30, 1947 |

FOREIGN PATENTS

| Number | Country | Date |
| --- | --- | --- |
| 19,243 | Great Britain | of 1913 |
| 153,657 | Great Britain | Nov. 8, 1920 |